United States Patent
Oikawa et al.

(10) Patent No.: US 10,384,277 B2
(45) Date of Patent: Aug. 20, 2019

(54) TOOL BODY AND CUTTING TOOL

(71) Applicant: TUNGALOY CORPORATION, Fukushima (JP)

(72) Inventors: Yuki Oikawa, Iwaki (JP); Ryuichi Saji, Iwaki (JP); Satoru Yoshida, Iwaki (JP)

(73) Assignee: TUNGALOY CORPORATION, Iwaki-shi, Fukushima (JP)

( * ) Notice: Subject to any disclaimer, the term of this patent is extended or adjusted under 35 U.S.C. 154(b) by 58 days.

(21) Appl. No.: 15/536,412

(22) PCT Filed: Apr. 21, 2016

(86) PCT No.: PCT/JP2016/062598
§ 371 (c)(1),
(2) Date: Jun. 15, 2017

(87) PCT Pub. No.: WO2016/203843
PCT Pub. Date: Dec. 22, 2016

(65) Prior Publication Data
US 2017/0326658 A1    Nov. 16, 2017

(30) Foreign Application Priority Data

Jun. 19, 2015   (JP) ................................ 2015-123399

(51) Int. Cl.
    *B23C 5/22*     (2006.01)
    *B23C 5/20*     (2006.01)
    *B23C 5/10*     (2006.01)

(52) U.S. Cl.
CPC ............ *B23C 5/2208* (2013.01); *B23C 5/109* (2013.01); *B23C 5/223* (2013.01); *B23C 5/2221* (2013.01);
(Continued)

(58) Field of Classification Search
CPC ...... B23C 2200/0494; B23C 2210/168; B23C 2210/16; B23C 5/2208; B23C 5/2204;
(Continued)

(56) References Cited

U.S. PATENT DOCUMENTS

| | | | |
|---|---|---|---|
| 2002/0053266 A1* | 5/2002 | Enquist | B23B 27/1655 82/1.11 |
| 2005/0152753 A1* | 7/2005 | DeRoche | B23C 5/109 407/48 |

(Continued)

FOREIGN PATENT DOCUMENTS

| | | | | |
|---|---|---|---|---|
| DE | 202013102510 U1 * | 6/2014 | ............ | B23C 5/109 |
| DE | 202013102510 U1 | 6/2014 | | |

(Continued)

OTHER PUBLICATIONS

Written Opinion issued in PCT/JP2016/062598; dated Jun. 21, 2016.
(Continued)

*Primary Examiner* — Ryan C Rufo
(74) *Attorney, Agent, or Firm* — Studebaker & Brackett PC (57) ABSTRACT

A tool body having an insert seat and a cutting tool which allow a cutting insert to be stably held are provided. A tool body according to the present invention is a tool body having an insert seat for mounting a cutting insert on the tool body, wherein the insert seat has a base surface and a side wall surface which extends so as to intersect with the base surface. The base surface has a contact surface and a contact projected part which come into contact with the cutting insert. A contact part of the contact surface is comprised of a surface, and a contact part of the contact projected part has a linear shape or a point shape.

12 Claims, 9 Drawing Sheets

(52) U.S. Cl.
CPC ...... *B23C 5/202* (2013.01); *B23C 2200/0494* (2013.01); *B23C 2200/164* (2013.01); *B23C 2210/168* (2013.01)

(58) Field of Classification Search
CPC ..... B23C 5/2213; B23C 5/2221; B23C 5/223; B23C 5/109
See application file for complete search history.

(56) References Cited

U.S. PATENT DOCUMENTS

| | | | |
|---|---|---|---|
| 2009/0035076 A1 | 2/2009 | Hecht | |
| 2010/0150670 A1* | 6/2010 | Hecht | B23C 5/109 407/40 |
| 2011/0097164 A1* | 4/2011 | Choi | B23C 5/08 407/46 |
| 2012/0251250 A1* | 10/2012 | Morrison | B23C 5/2221 407/42 |
| 2014/0086694 A1* | 3/2014 | Fang | B23C 5/2221 407/48 |
| 2014/0212228 A1* | 7/2014 | Horiike | B23C 5/109 407/42 |

FOREIGN PATENT DOCUMENTS

| | | | | |
|---|---|---|---|---|
| EP | 2614907 A1 | * | 7/2013 | ............. B23C 5/207 |
| EP | 2617505 A1 | | 7/2013 | |
| JP | H08-243832 A | | 9/1996 | |
| JP | H10-509921 A | | 9/1998 | |
| JP | 2011-510829 A | | 4/2011 | |
| JP | 2013-013943 A | | 1/2013 | |
| JP | 2013091153 A | * | 5/2013 | ............. B23C 5/109 |
| WO | 02/055243 A1 | | 7/2002 | |
| WO | WO-2010097797 A1 | * | 9/2010 | ............... B23C 5/06 |

OTHER PUBLICATIONS

International Preliminary Report on Patentability issued in PCT/JP2016/062598; dated Dec. 19, 2017.
International Search Report issued in PCT/JP2016/062598; dated Jun. 21, 2016.

\* cited by examiner

TOOL BODY AND CUTTING TOOL

TECHNICAL FIELD

The present invention relates to a tool body on which a cutting insert is removably mounted, and a cutting tool comprising such tool body.

BACKGROUND ART

A cutting insert having cutting edges on both surfaces thereof is often used because such cutting insert can achieve an increased number of usable cutting edges. Patent Document 1 describes an example of a rotary cutting tool which uses a cutting insert having cutting edges on both surfaces thereof. In this cutting insert, a seating surface is formed so as to be depressed inward with respect to a cutting edge. The seating surface is formed so as to be planar. Patent Document 1 further describes an insert seat (insert pocket) for the mounting of such cutting insert. A base surface (seating surface) of the insert seat has a plane which comes into contact with the cutting insert.

CITATION LIST

Patent Documents

Patent Document 1: JP2013-013943 A

SUMMARY

Technical Problem

In order to stably hold a cutting insert during cutting, a seating surface of a cutting insert and a plane of a base surface of an insert seat are required to come into contact with each other via a wide area. However, when a cutting insert has cutting edges on both surfaces thereof and is provided with a seating surface which is depressed inward with respect to a cutting edge, it is difficult for the seating surface of the cutting insert to be provided as a highly accurate flat surface. In other words, a highly accurate flat surface can be obtained by a grinding process, etc., whereas it is difficult to perform a grinding process, etc., on the seating surface of the cutting insert described in Patent Document 1. Thus, even if the base surface of the insert seat is comprised of a highly accurate flat surface, the contact state with the seating surface of the cutting insert may be unstable. If the posture of the cutting insert is unstable during cutting, the cutting insert is prone to the occurrence of abnormal damage or prone to reduced machining accuracy of a workpiece.

An object of the present invention is to provide a tool body having an insert seat and a cutting tool which allow a cutting insert to be stably held.

Solution to Problem

A tool body according to the present invention is a tool body having an insert seat for mounting a cutting insert on the tool body, wherein: the insert seat has a base surface and a side wall surface which extends so as to intersect with the base surface. The base surface has a contact surface and a contact projected part which come into contact with the cutting insert. A contact part of the contact surface is comprised of a surface, and a contact part of the contact projected part has a linear shape or a point shape.

A cutting tool according to the present invention comprises the tool body of the present invention.

DESCRIPTION OF EMBODIMENTS

Figure 1:
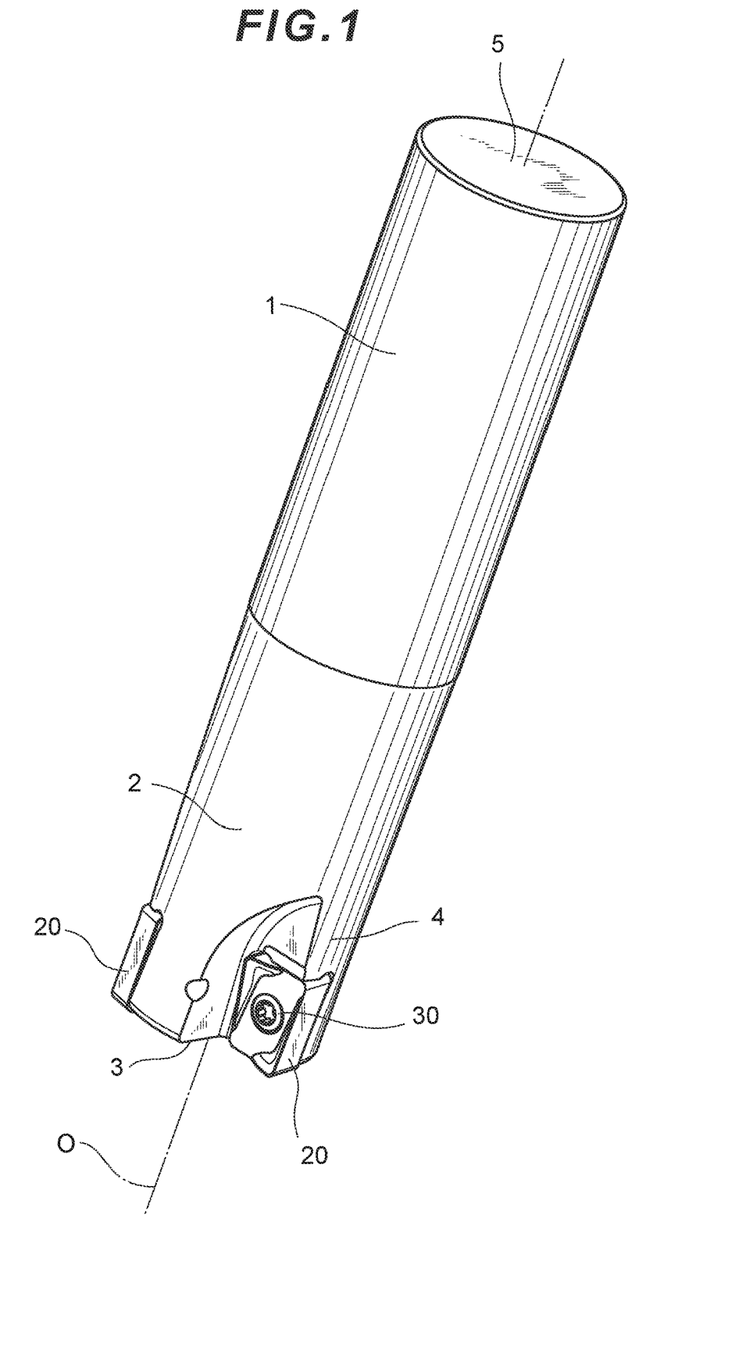
FIG. 1 is a perspective view of a cutting tool according to an embodiment of the present invention.
Figure 2:
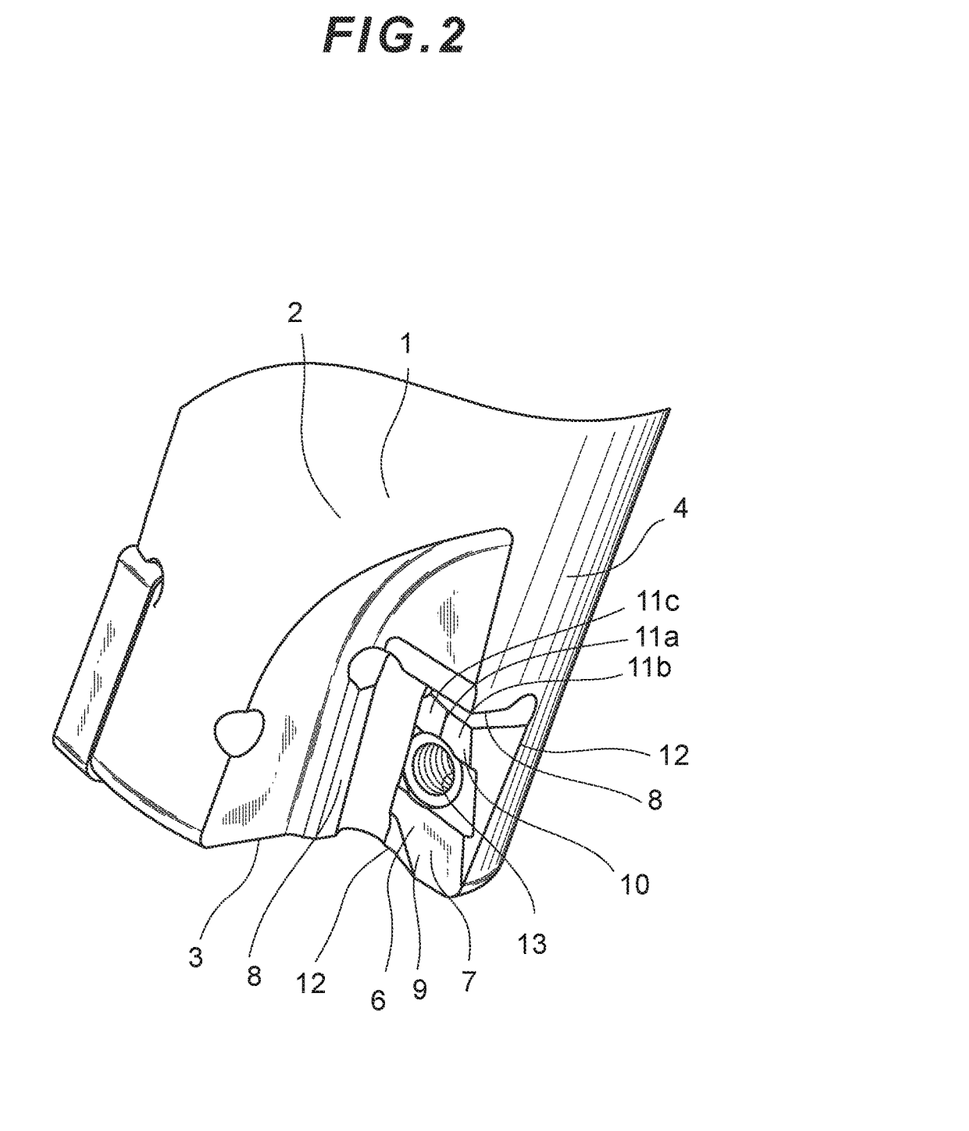
FIG. 2 is a partially enlarged perspective view of a portion around an insert seat from which the cutting insert has been removed from the cutting tool of FIG. 1.
Figure 3:
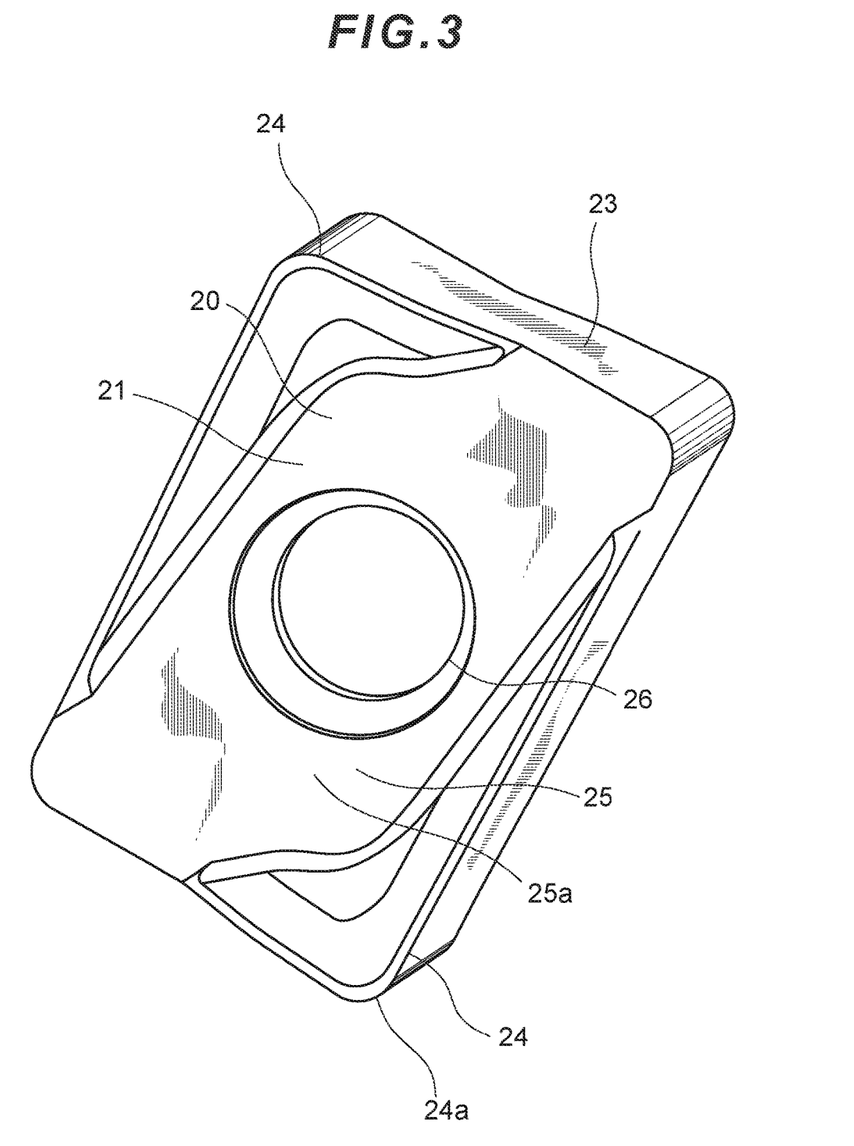
FIG. 3 is a perspective view of a cutting insert which is mounted on the cutting tool of FIG. 1.
Figure 4:
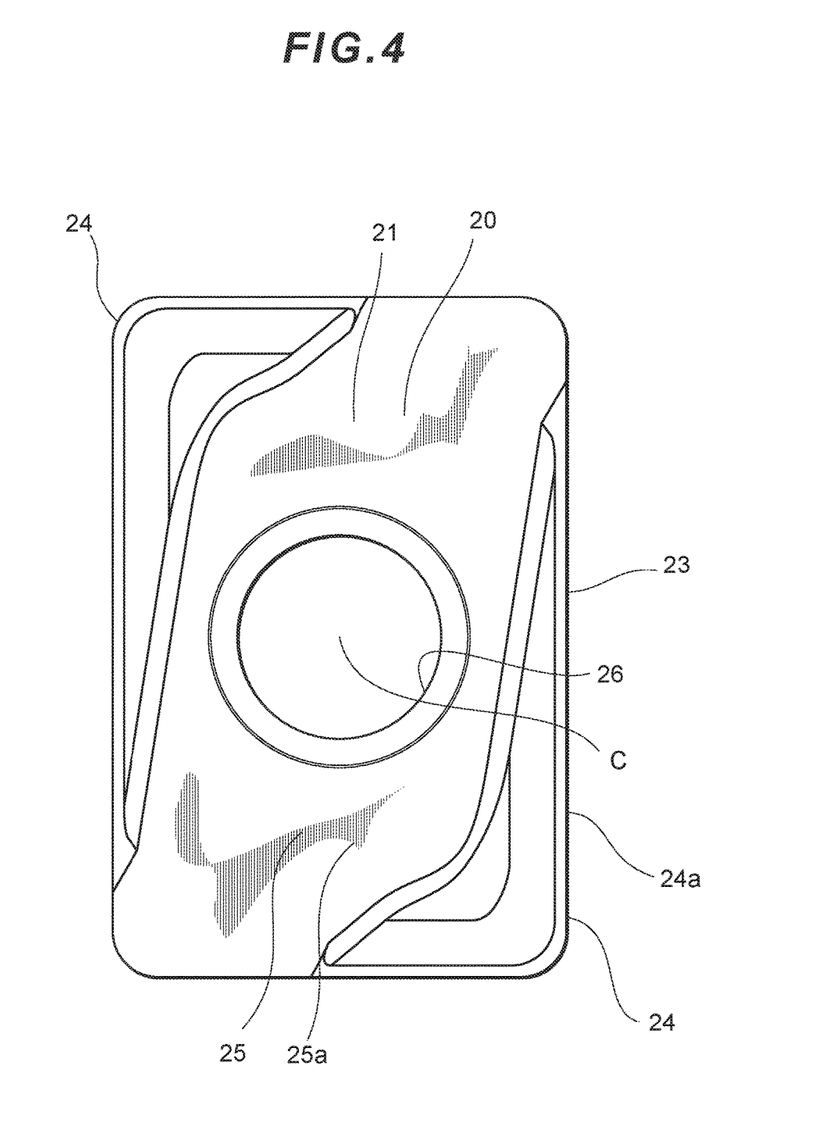
FIG. 4 is a plan view of the cutting insert of FIG. 3.

An embodiment of the present invention will now be described as appropriate, with reference to the attached drawings. As shown in FIG. 1, a cutting tool 1 of the present embodiment is a rotary cutting tool which employs three cutting inserts 20 and comprises a tool body 2 and in which a tool rotational axis O is defined. The tool body 2 has three insert seats 6 which are equal in number to the cutting inserts 20, as shown in FIG. 2, in order to mount the cutting inserts 20 on the tool body 2.

The cutting insert 20 of the present embodiment has, as shown in FIGS. 3 to 6, first and second end surfaces 21, 22 which are substantially opposed to each other, i.e., which are substantially opposite to each other, and a peripheral side surface 23 which connects these end surfaces. The first end surface 21 is formed in a substantially rectangular shape in a plan view. The cutting insert 20 has a hole 26 which penetrates substantially respective centers of the first and second end surfaces 21, 22. An intersecting edge between the first end surface 21 and the peripheral side surface 23 is provided with a first cutting edge 24a which acts as a cutting edge 24. Further, an intersecting edge between the second end surface 22 and the peripheral side surface 23 is provided with a second cutting edge 24b. It should be noted that a plurality of the cutting edges 24 is formed for each of the first and second end surfaces 21, 22, and such cutting edges 24 are shaped and arranged so as to be of 180-degree rotational symmetry about a central axis C of the hole 26. Therefore, in each of the first and second end surfaces 21, 22, when damage occurs due to the use of one cutting edge 24, the cutting insert 20 is removed and rotated around the central axis C, so that such cutting edge 24 is replaced with another cutting edge 24, and this allows the cutting insert 20 to be used multiple times, which is economical. It should be noted that the second cutting edge 24b of the cutting insert 20 of the present embodiment is shaped and arranged so as to be of 180-degree rotational symmetry with the first cutting edge 24a around the rotational axis when the first end surface 21 and the second end surface 22 of the cutting insert 20 are inverted. Therefore, the first end surface 21 and the second end surface 22 can be reversed, resulting in the cutting insert 20 being even more economical. The bottom view, left side view and back view of the cutting insert 20 are not shown herein since they are the same as the plan view, right side view and front view thereof.

Figure 5:
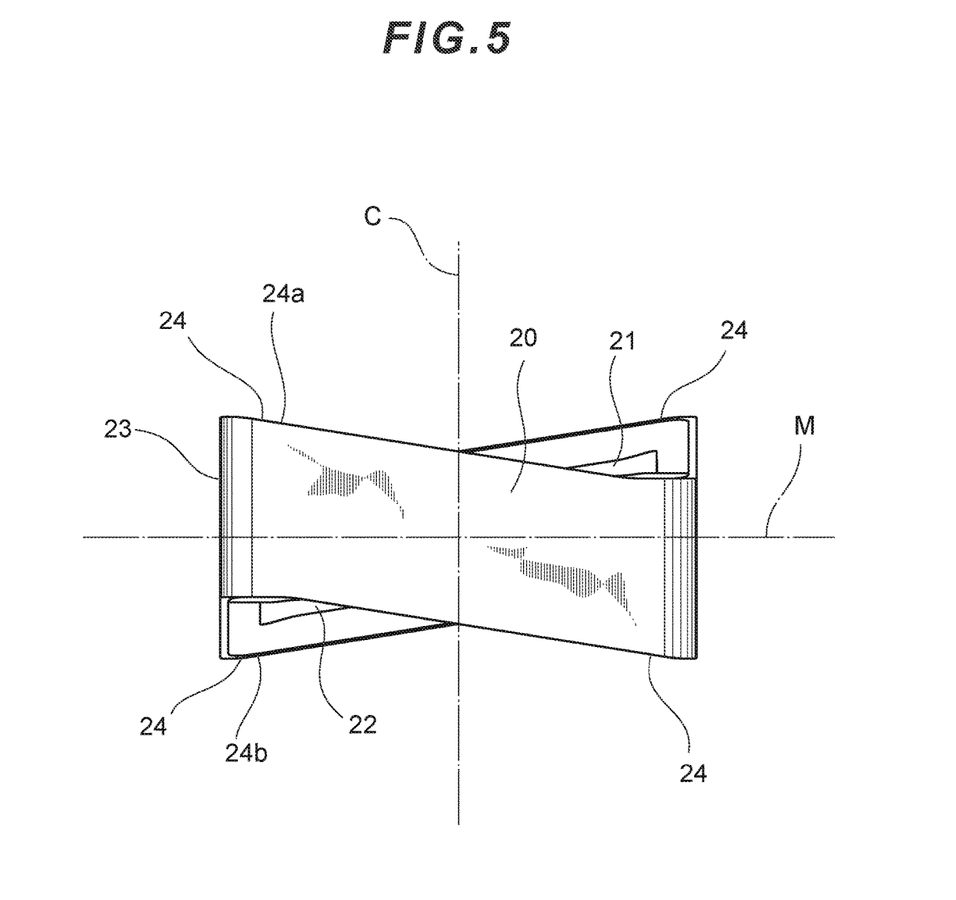
FIG. 5 is a right side view of the cutting insert of FIG. 3.
Figure 6:
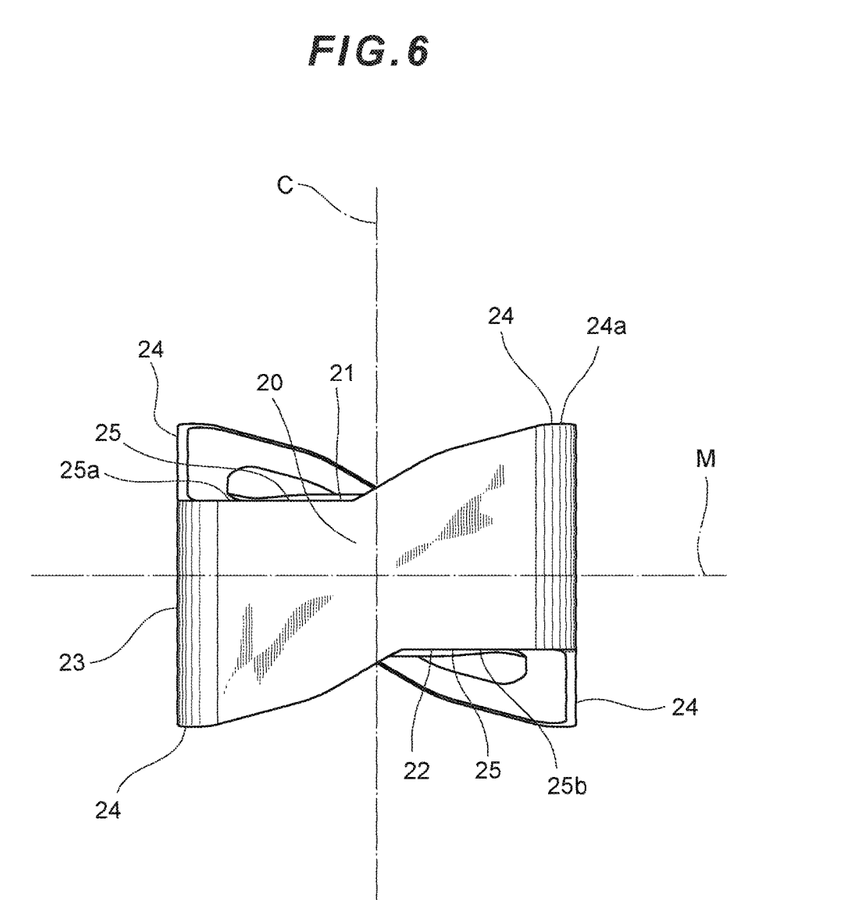
FIG. 6 is a front view of the cutting insert of FIG. 3.
Figure 7:
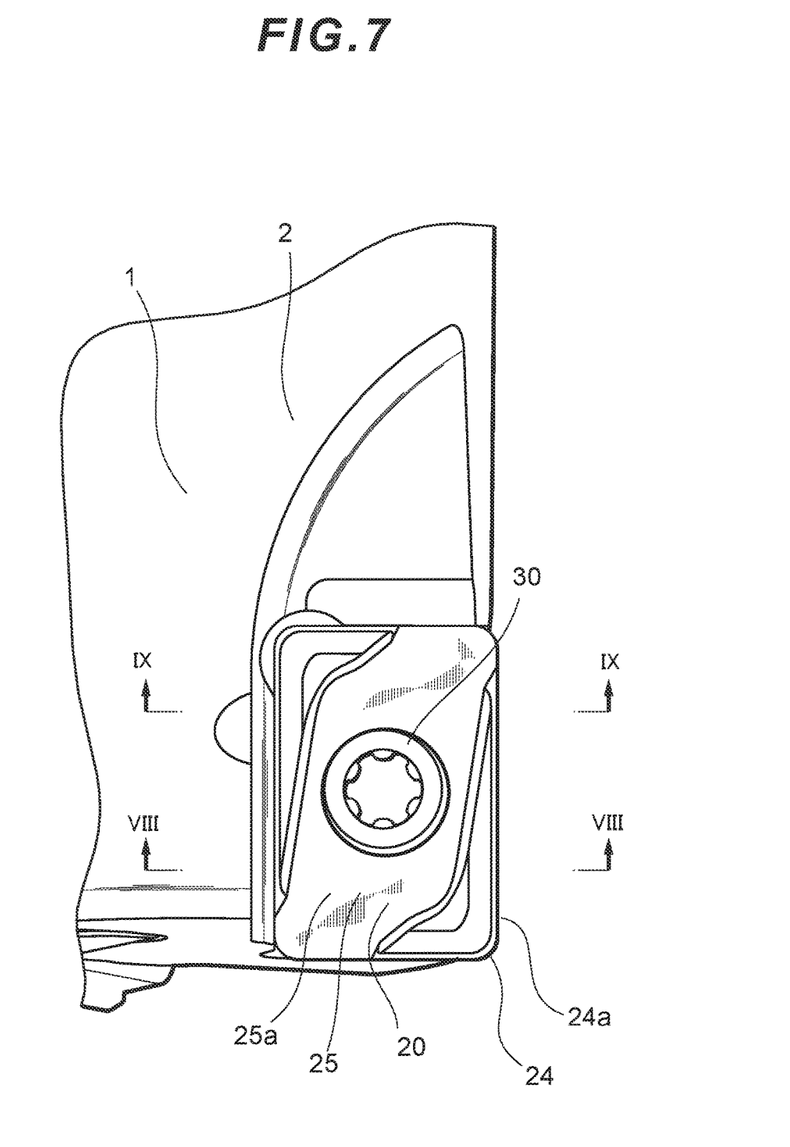
FIG. 7 is an enlarged perspective view in which the cutting tool of FIG. 1 is viewed from a direction facing the cutting insert.

The first end surface 21 comprises a first seating surface 25a which acts as a seating surface 25 when the cutting insert 20 is mounted on the insert seat 6 so as to allow the second cutting edge 24b to be used. The second end surface 22 comprises a second seating surface 25b which acts as a seating surface 25 when the cutting insert 20 is mounted on the insert seat 6 so as to allow the first cutting edge 24a to be used. The seating surface 25 is a surface to be brought into contact with the insert seat 6 when mounting the cutting insert 20 on the cutting tool 1. Each seating surface 25 is comprised of a substantially flat surface. More specifically, each of the seating surfaces 25a, 25b is a plane. The seating surface 25 is formed so as to surround the hole 26. Herein, as shown in FIGS. 5 and 6, an intermediate plane M is defined in the middle of the first end surface 21 and the second end surface 22. In FIGS. 5 and 6, the intermediate plane M is defined so as to be in the middle of the first end surface 21 and the second end surface 22 and to be parallel to the first seating surface 25a of the first end surface 21. The first seating surface 25a is arranged so as to be closer to the intermediate plane M than the first cutting edge 24a, and the second seating surface 25b is arranged so as to be closer to the intermediate plane M than the second cutting edge 24b. In other words, at least part of the first cutting edge 24a is more distant from the intermediate plane M than the first seating surface 25a, and at least part of the second cutting edge 24b is more distant from the intermediate plane M than the second seating surface 25b. Herein, a line vertical to the intermediate plane M is a line which is parallel to the central axis C of the hole 26 and is also a line along a thickness direction of the cutting insert 20. Thus, it can also be said that at least part of the first cutting edge 24a is more distant outward, in the thickness direction of the cutting insert 20, than the first seating surface 25a, and can also be said that at least part of the second cutting edge 24b is more distant outward, in the thickness direction of the cutting insert 20, than the second seating surface 25b.

For the material of the cutting insert 20, at least portions near the cutting edges 24 are made of hard materials, such as a cemented carbide, cermet, ceramic, and a sintered body containing cubic boron nitride, materials obtained by applying PVD or CVD coating to the surface of these hard materials, or a sintered body containing diamond or monocrystalline diamond. It should be noted that portions other than the portions near the cutting edges 24 are preferably made of similarly hard materials.

The cutting insert 20 having the above-described configuration is removably mounted on the insert seat 6 of the tool body 2 of the cutting tool 1 of the present embodiment, using a clamping member 30 serving as a mechanical mounting means. The cutting tool 1 and the tool body 2 on which the cutting insert 20 is mounted will further be described with reference to FIGS. 1, 2, and 7 to 9. The cutting tool 1 of the present embodiment employs a fastening screw 30 as the clamping member 30.

The cutting tool 1 comprises the tool body 2 provided with a plurality of insert seats 6 (three seats in this example). One cutting insert 20 can be removably mounted on each insert seat 6. It should be noted that, although not shown in the drawings, the present invention does not exclude a cutting tool comprising a tool body provided with only one insert seat.

The tool body 2 is configured so as to rotate around the tool rotational axis O, which is defined so as to pass through the tool body 2 from a leading end 3 to a base end 5. In other words, the tool body 2 is generally formed in a substantially cylindrical shape. The three insert seats 6 are provided around the leading end 3 of the tool body 2 at equal angle intervals around the tool rotational axis O. All the cutting inserts 20 used for this cutting tool 1 have the same configuration and the same shape. Therefore, all the insert seats 6 provided in the tool body 2 also have the same shape. The cutting tool 1 of the present embodiment is a rotary cutting tool. More specifically, the cutting tool 1 of the present embodiment is an end mill which allows for shoulder milling using the above-described cutting insert 20.

The cutting insert 20 is mounted on each insert seat 6 in the tool body 2 so that the first surface 21 or the second surface 22 faces forward in a tool rotating direction around the tool rotational axis O. Each insert seat 6 has a base surface 7 and a side wall surface 8, and is open toward the leading end 3 and an outer periphery 4 of the tool body 2. In other words, each insert seat 6 has an opening 12 where the side wall surface 8 of the insert seat 6 is open, and such opening 12 is opened toward the leading end 3 and the outer periphery 4. Herein, a surface with which the first or second end surface 21, 22 of the cutting insert 20 comes into contact is called the base surface 7 of the insert seat 6, while a surface with which the peripheral side surface 23 of the cutting insert 20 comes into contact is called the side wall surface 8. The base surface 7 faces forward in the tool rotating direction around the tool rotational axis O. The side wall surface 8 extends so as to intersect with the base surface 7 and has a shape corresponding to the peripheral side surface 23 of the cutting insert 20. The cutting insert 20 of the present embodiment has a substantially rectangular plate shape, and thus, the side wall surface 8 is constituted by a wall surface facing toward the outer periphery 4 and a wall surface facing toward the leading end 3. The base surface 7 and the side wall surface 8 form a pocket-shaped space for the mounting of the cutting insert 20.

The cutting insert 20 is arranged on the insert seat 6 and fixed with the fastening screw 30 so that one of the cutting edges 24 of the cutting insert 20 is made available, i.e., such cutting edge 24 serves as an active cutting edge. Hereinafter, the configuration of the insert seat 6 will be specifically described in an example in which the cutting insert 20 is mounted on the insert seat 6 so as to make the above-described first cutting edge 24a available. In the cutting tool 1 illustrated in FIG. 1, the cutting insert 20 is mounted on the insert seat 6 so that the first cutting edge 24a serves as an active cutting edge. As already stated above, the cutting insert 20 is also mounted on the insert seat 6 in a similar way if each of the remaining cutting edges 24 is used as an active cutting edge, and thus, the descriptions thereof will be omitted here.

As shown in FIG. 2, the base surface 7 of the insert seat 6 is provided with a contact surface 9, a contact projected part 10 and a threaded hole 13. The contact surface 9 is formed so as to be substantially flat. More specifically, the contact surface 9 of the cutting tool 1 of the present embodiment is comprised of a plane. The contact projected part 10 has first and second planes 11b, 11c and a contact edge 11a linearly formed in an intersecting edge between these planes. The contact edge 11a is provided on the side opposite to the contact surface 9 across the threaded hole 13. The contact edge 11a is arranged on a plane which is coplanar with the contact surface 9. Therefore, the contact surface 9 and the contact edge 11a respectively come into contact, in cooperation, with the seating surface 25 of the cutting insert 20. The contact state between the cutting insert 20 and the contact surface 9 is schematically shown in FIG.

Figure 8:
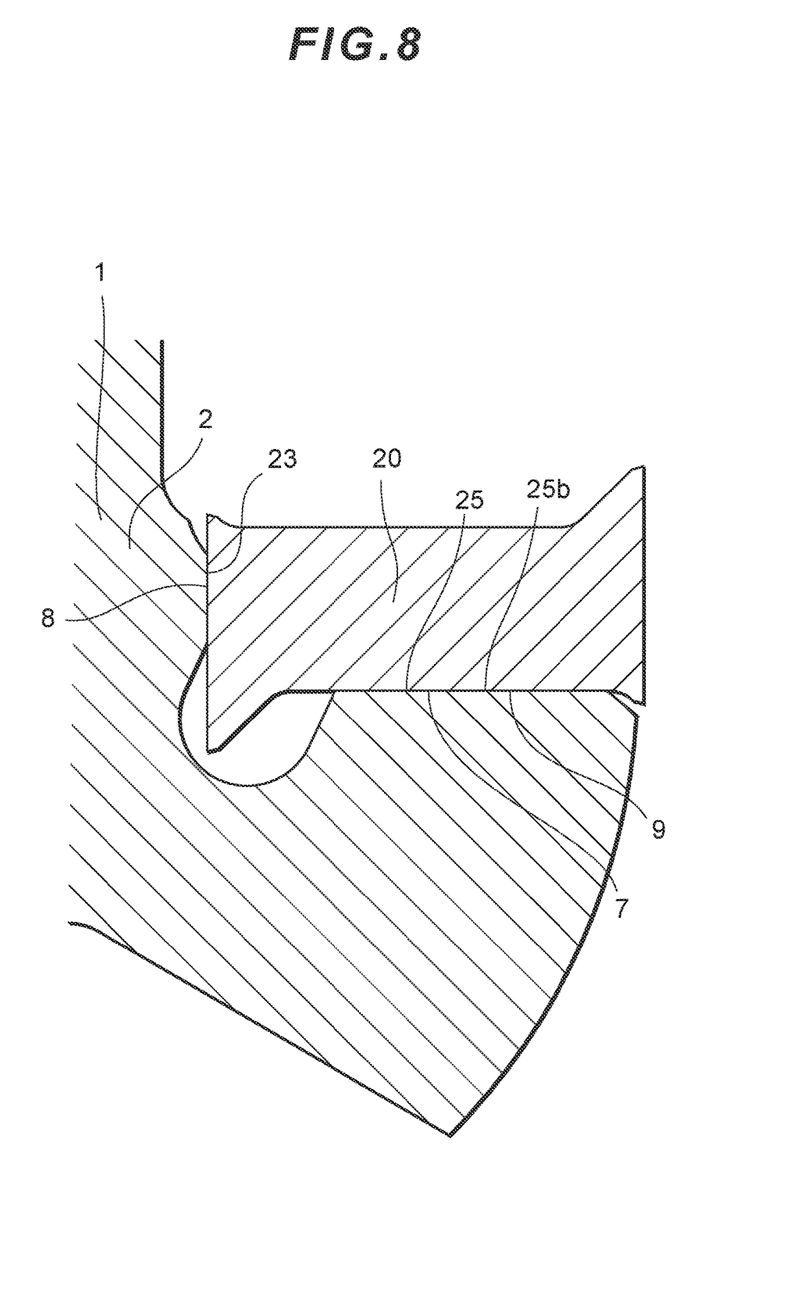
FIG. 8 is a schematic cross-sectional view taken along a XIII-XIII line of FIG. 7.
Figure 9:
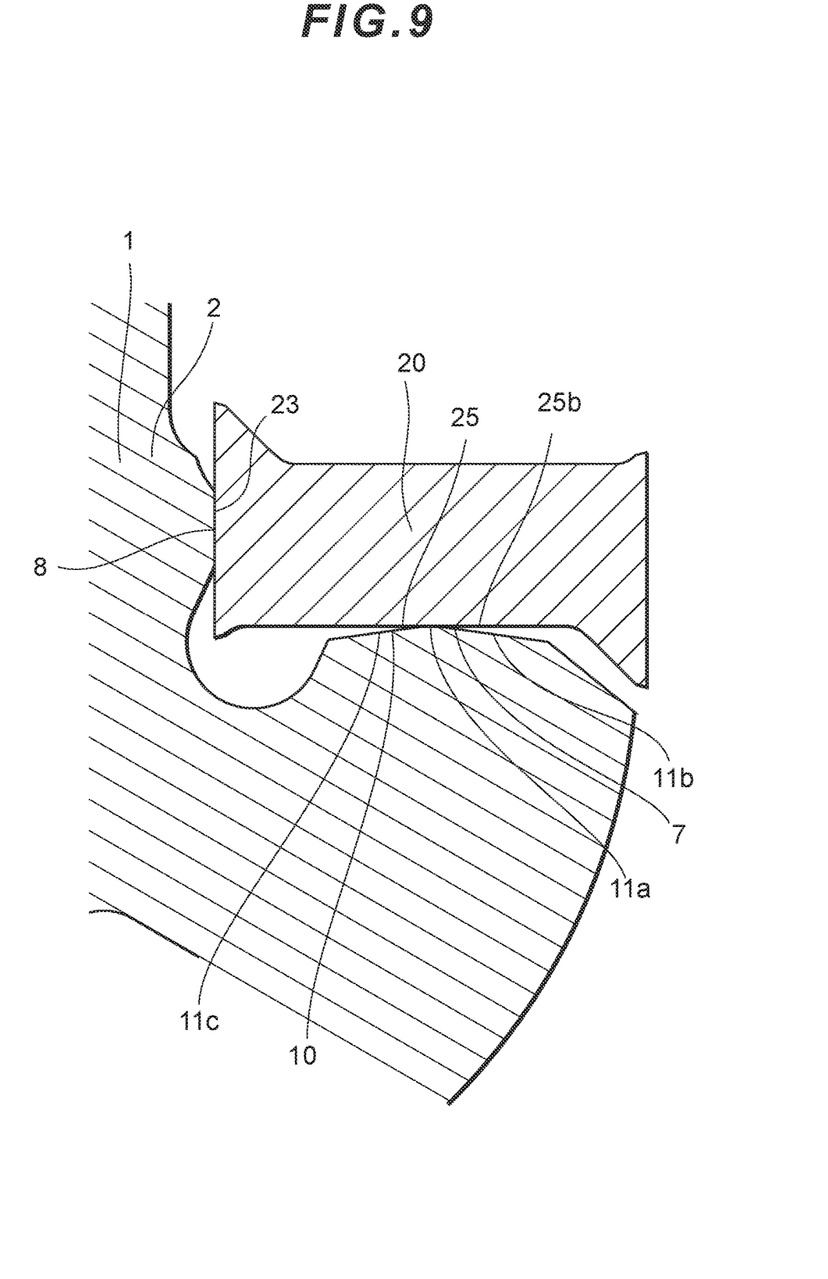
FIG. 9 is a schematic cross-sectional view taken along a IX-IX line of FIG. 7.

8. FIG. 8 is a schematic cross-sectional view taken along a VIII-VIII line of FIG. 7. The seating surface 25 of the cutting insert 20 and the contact surface 9 come into surface contact with each other since they are respectively formed as planes. The contact state between the cutting insert 20 and the contact edge 11a is schematically shown in FIG. 9. FIG. 9 is a schematic cross-sectional view taken along a IX-IX line of FIG. 7. The cutting insert 20 and the contact edge 11a come into line contact with each other since the contact edge 11a is substantially linear. In other words, a contact at a single point is made in the schematic cross-sectional view.

The operation and effects of the cutting insert 20 described above and the cutting tool 1 on which such cutting insert 20 is mounted will be described below.

The first seating surface 25a of the cutting insert 20 is arranged so as to be closer to the intermediate plane M than the first cutting edge 24a, and the second seating surface 25b is arranged so as to be closer to the intermediate plane M than the second cutting edge 24b. Thus, chip discharging efficiency is excellent when the cutting edges 24 are provided on both the first and second end surfaces 21, 22, where cutting is performed using each of the cutting edges 24a, 24b. It should be noted that each of the first and second seating surfaces 25a, 25b can easily be brought into contact with the insert seat 6 since they are each formed in a substantially flat surface shape.

The contact surface 9 of the tool body 2 is formed in a substantially flat surface shape and is also formed on the leading end 3 side of the cutting tool 1. Therefore, the contact surface 9 can come into surface contact with the second seating surface 25b, in the vicinity of the active cutting edge of the cutting insert 20. As a result, the cutting insert 20 can be reliably and stably supported.

The contact edge 11a of the tool body 2 is formed so as to be coplanar with the contact surface 9 and is formed so as to be linear. Thus, the contact edge 11a comes into line contact with the second seating surface 25b of the cutting insert 20, in cooperation with the contact surface 9. In other words, as to contact parts, the contact surface 9 acts in a primary manner so as to reliably and stably support an area in the periphery of the cutting edge 24 while the contact edge 11a acts in an auxiliary manner so as to prevent the cutting insert 20 from being tilted. As described above, in the tool body 2 and the cutting tool 1 in the present embodiment, the base surface 7 of the insert seat 6 has the contact surface 9 and also has the contact projected part 10, and this enhances the stability of the cutting insert 20 when cutting is performed. As a result, the prevention of abnormal damage of the cutting insert 20 and the improvement of machining accuracy of a workpiece can be achieved.

More detailed descriptions will be made below. In addition to the operation and effects of the above-described embodiment, preferable modifications will also be described below.

The cutting insert 20 of the present embodiment is suited for an end mill which allows for shoulder milling, but the cutting insert 20 is not limited thereto. The present invention is applicable to a method of fixing cutting inserts in various forms and uses. However, the present invention is not necessarily effective when a seating surface of a cutting insert is provided, through a grinding process, etc., as a highly accurate flat surface which extends over a wide range due to, for example, the formation of cutting edges on only one of the end surfaces of the cutting insert. This is because, when a seating surface of a cutting insert is comprised of a highly accurate flat surface, a base surface of an insert seat is preferably also comprised of a highly accurate plane. The present invention is particularly effective when both the two end surfaces 21, 22 are provided with the cutting edges 24 and also when the seating surfaces 25 are closer to the intermediate plane M than the cutting edges 24, as in the cutting insert 20 of the present embodiment. If a seating surface is formed in the above-described shape, it is difficult to subject the seating surface to a grinding process. Therefore, such seating surface is often kept as it is after being obtained through a process of pressing and sintering of powder material; alternatively, a coating is often further applied to the seating surface obtained through such process. In such case, the flatness of a seating surface is not necessarily high, and thus, if a base surface of an insert seat is comprised of a highly accurate flat surface, it is difficult to bring the entirety of such seating surface into contact with such base surface. Therefore, it is effective to form a base surface of an insert seat as in the present invention so as to achieve selectively limited contact portions.

The seating surface 25 of the cutting insert 20 of the present embodiment is formed so as to be substantially flat, but the configuration is not limited thereto. The seating surface may have any shape, as long as it is capable of coming into contact with a base surface of an insert seat. Although not shown in the drawings, the seating surface may also be comprised of a curved surface, by way of example. However, the seating surface is preferably formed so as to be substantially flat, in order to bring the seating surface into contact, via a wide area, with a contact surface of an insert seat.

In the case of an end mill which allows for shoulder milling as in the cutting tool 1 of the present embodiment, the cutting edge 24 is formed in the leading end 3 and the outer periphery 4. Therefore, in order to oppose the cutting resistance applied on the cutting edge 24, the contact surface 9 which comes into contact with the seating surface 25 is preferably as close as possible to the leading end 3 and the outer periphery 4. In other words, as in the insert seat 6 of the present embodiment, the contact surface 9 is preferably formed so as to be closer to the leading end 3 and the outer periphery 4. Further, the contact edge 11a, which cooperates with the contact surface 9, is preferably formed at a position as distant as possible from the contact surface 9, as long as the contact edge 11a can come into contact with the seating surface 25 of the cutting insert 20. In other words, when the contact surface 9 is formed on the leading end 3 side, the contact edge 11a is preferably formed at a distant position, from the contact surface 9, on the base end 5 side. When the contact surface 9 is formed on the outer periphery 4 side, the contact edge 11a is preferably formed at a distant position, from the contact surface 9, on the tool rotational axis O side. In other words, the contact edge 11a is most preferably formed at a distant position, from the contact surface 9, on the base end 5 side and also on the tool rotational axis O side.

As described above, the first and second end surfaces 21, 22 of the cutting insert 20 of the present embodiment are formed in a substantially rectangular shape in a plan view. Therefore, a longer-side direction and a shorter-side direction are also defined for the seating surface 25. Similarly, the base surface 7 of the insert seat 6 is formed in a substantially rectangular shape corresponding to the shape of the cutting insert 20. Therefore, a longer-side direction and a shorter-side direction are also defined for the base surface 7. In the cutting tool 1 of the present embodiment, the longer-side direction substantially corresponds to the axial direction of the tool rotational axis O. Further, when the contact surface 9 is formed so as to be closer to one side in the longer-side direction, i.e., on the leading end 3 side, the contact edge 11a is preferably formed at a distant position, in the longer-side direction, from the contact surface 9. In other words, the contact edge 11a is preferably formed on the base end 5 side.

The contact surface 9 of the tool body 2 of the present embodiment is formed so as to be substantially flat, but the shape is not limited thereto. The contact surface 9 may have any shape, as long as it is capable of coming into contact with the seating surface 25 of the cutting insert 20. As described above, a seating surface of a cutting insert may be comprised of a curved surface. Therefore, a contact surface may be comprised of a curved surface corresponding to such seating surface. However, when a seating surface is formed so as to be substantially flat, a contact surface is also preferably formed so as to be substantially flat.

The contact projected part 9 of the tool body 2 of the present embodiment is formed so as to have the linear contact edge 11a, but the configuration is not limited thereto. The contact projected part may have any shape, as long as it is, in cooperation with the contact surface, capable of coming into contact with a seating surface of a cutting insert. Although not shown in the drawings, the contact projected part may have, for example, a shape in which only an apex thereof, i.e., one point, comes into contact with the seating surface. However, the contact projected part more preferably comes into contact with the seating surface via a linear (ridge-shaped) contact edge. When the contact projected part is brought into contact with the seating surface via only the apex of the contact projected part, i.e., one point, the contact projected part is likely to be damaged due to cutting resistance. Therefore, the contact projected part preferably comes into contact with the seating surface via a linear edge rather than a point edge. The shape of the contact edge is not limited to a linear shape, and the contact edge may have any shape, as long as it is capable of coming into contact with the seating surface. However, when the seating surface is formed so as to be substantially flat, the contact edge is preferably formed on a plane which is coplanar with the contact surface. The contact edge is further preferably formed so as to be linear.

It has been described that the contact edge 11a comes into line contact with the seating surface 25. However, in a strict sense, the contact edge 11a comes into surface contact having a small width with the seating surface 25. This is because, even if the intersecting edge is formed as a sharp edge, it will undergo plastic deformation due to the application of cutting resistance, etc. Therefore, contact where the contact surface has a width of 0.5 mm or less is herein referred to as line contact. As described above, the present invention has the feature in which, as to contact parts, the contact surface 9 acts in a primary manner so as to reliably and stably support an area in the periphery of the cutting edge 24 while the contact edge 11a acts in an auxiliary manner so as to prevent the cutting insert 20 from being tilted. Therefore, the contact edge 11a acts in an auxiliary manner if it has a sufficiently narrow area compared with the contact surface 9. In terms of the area ratios, the contact area of the contact surface 9 is preferably ten times or more of the contact surface of the contact edge 11a. The contact edge 11a can also be expressed using the width-to-length ratio. The contact edge preferably has a width of 20% or less of the length thereof.

Each insert seat 6 of the tool body 2 of the present embodiment is provided with one contact surface 9 and one contact projected part 10, but the configuration is not limited thereto. A plurality of contact surfaces 9 and a plurality of contact projected parts 10 may be formed. However, the number of contact surfaces 9 is preferably not increased so much since it is effective to provide contact portions in a clear manner. In other words, it is preferable for only one contact surface 9 to be formed. The contact projected part 10 is preferably arranged at a distant position from the contact surface 9, and thus, no limitation is placed on the number of contact projected parts to be formed. However, consideration needs to be given to ensure that an increased number of contact projected parts 10 does not prevent the contact surface 9 from acting in a primary manner. Therefore, it is preferable for only one contact projected part 10 and only one contact edge 11a to be formed.

The cutting insert 20 of the present embodiment has a substantially rectangular plate shape, but the shape is not limited thereto. The present invention can be applied to cutting inserts having various forms including a substantially parallelogram shape and a substantially triangular shape. However, the cutting insert preferably has a substantially quadrangular plate shape. The cutting insert further preferably has a substantially parallelogram plate shape for which a longer-side direction thereof is defined. The base surface of the insert seat corresponding to the cutting insert preferably also has a substantially quadrangular plate shape. The base surface further preferably has a substantially parallelogram plate shape for which a longer-side direction thereof is defined. When causing a contact surface and a contact edge to cooperate with each other with respect to a cutting insert for which a longer-side direction thereof is defined, the maximum effect of the present invention can be achieved.

As described above, the cutting tool 1 of the present invention uses a fastening screw 30 as the clamping member 30. However, the clamping member 30 is not limited thereto, and various known techniques, such as wedges and presser pieces, may be used for the clamping member. However, there may be cases where: an improved chip discharging efficiency is preferred when a cutting insert is used for an end mill which performs machining of the workpiece in three dimensions; a reduced cutting resistance is preferred in order to prevent the occurrence of chatter; or a rotary cutting tool having a smaller diameter is preferred due to the limitation with respect to the diameter of the applicable tools. In light of such demands, the cutting tool 1 of the present invention preferably uses a fastening screw 30. By using a fastening screw 30, a cutting insert can be easily mounted even if its seating surface 24 is located at a lower level than the cutting edge 24, as in the present embodiment, i.e., the cutting insert 1 is formed so as to have a so-called raised cutting edge. Moreover, the chip discharging efficiency can be improved as there are no obstacles, such as wedges or presser pieces, on the rake surface side. In addition, the configuration is simple and is therefore advantageous for reducing size, and the applicable range can therefore be broadened to tools having smaller diameters.

The above-described cutting tools can be attached to machine tools so as to be used for the cutting of steel, etc.

Embodiments of the cutting insert, tool body and cutting tool according to the present invention have been described above, but the embodiments of the present invention are not limited to those described above.

For example, the cutting tool is not limited to an end mill, and the present invention can also be applied to face mill cutters, disk-like side cutters and the like. The present invention can be applied not only to a rotary cutting tool, as in the above-described embodiment, but also to other forms of cutting tools, including turning tools and drilling tools, etc.

In the above-described embodiments and modifications, etc., the present invention has been described specifically in a given way, but the present invention is not limited to the described embodiments. It should be appreciated that various alterations and changes can be made to the present invention without departing from the gist and scope of the invention defined in the claims. The present invention encompasses all kinds of modifications, applications and equivalents that are encompassed by the idea of the present invention defined by the scope of the claims.

REFERENCE SIGNS LIST

1 Cutting tool
2 Tool body
3 Leading end
4 Outer periphery
5 Base end
6 Insert seat
7 Base surface
8 Side wall surface
9 Contact surface (first contact part)
10 Contact projected part (second contact part)
11a Contact edge
11b First plane of the contact projected part
11c Second plane of the contact projected part
12 Opening
13 Threaded hole
20 Cutting insert
21 First end surface
22 Second end surface
23 Peripheral side surface
24 Cutting edge
24a First cutting edge
24b Second cutting edge
25 Seating surface
25a First seating surface
25b Second seating surface
26 Hole
30 Clamping member (fastening screw)
C Central axis of the cutting insert
M Intermediate plane
O Tool rotational axis

What is claimed is:

1. A tool body having an insert seat for mounting a cutting insert on the tool body, wherein:
   the insert seat has a base surface and a side wall surface that extend in intersecting directions relative to one another;
   the base surface has a contact surface and a contact projected part which come into contact with the cutting insert, the contact surface and the contact projected part being spaced apart on opposite sides of a fastening hole in the insert seat;
   the contact surface is substantially flat;
   the entire contact surface defines and lies within a contact plane;
   the contact projected part comprises two inclined planar surfaces intersecting at an apex contact edge;
   the apex contact edge has a linear shape;
   the apex contact edge lies within the contact plane such that the contact surface and the apex contact edge are coplanar; and
   the contact projected part is configured to make contact with the cutting insert at only the apex contact edge when the cutting insert is mounted on the tool body.

2. The tool body according to claim 1, wherein:
   the insert seat has an opening where the side wall surface is open; and
   the apex contact edge is located so as to be more distant from the opening than the contact surface.

3. The tool body according to claim 1, wherein:
   a longer-side direction is defined for the base surface, the longer-side direction substantially corresponding to an axial direction of a tool rotational axis (O) of the tool body; and
   the contact surface and the contact projected part are arranged so as to be distant from each other in the longer-side direction.

4. The tool body according to claim 1, wherein the base surface has a substantially quadrangular shape.

5. A cutting tool comprising:
   the tool body according to claim 1; and
   the cutting insert mounted on the tool body.

6. The cutting tool according to claim 5, the cutting tool being comprised of a rotary cutting tool having a tool rotational axis (O).

7. The cutting tool according to claim 6, wherein:
   at least one insert seat has an opening where the side wall surface is open; and
   the opening is opened toward at least an outer periphery which is distant from the tool rotational axis (O).

8. The cutting tool according to claim 6, wherein the contact surface and the contact projected part are arranged so as to be distant from each other in a direction in which the tool rotational axis (O) extends.

9. The cutting tool according to claim 5, wherein the contact surface is arranged so as to be closer to a leading end of the cutting tool than the contact projected part.

10. The cutting tool according to claim 5, wherein the cutting insert has a substantially parallelogram plate shape.

11. The cutting tool according to claim 5, wherein:
   the cutting insert has first and second end surfaces each of which has a substantially parallelogram shape, and a peripheral side surface which connects the first and second end surfaces;
   an intersecting edge between the first end surface and the peripheral side surface has a first cutting edge; and
   an intersecting edge between the second end surface and the peripheral side surface has a second cutting edge.

12. The cutting tool according to claim 11, wherein:
   the cutting insert has a though hole extending between the first and second end surfaces;
   the cutting insert has first and second seating surfaces respectively in the first and second end surfaces;
   at least part of the first cutting edge is more distant outward, in a thickness direction of the cutting insert parallel with a longitudinal axis of the through hole, than the first seating surface of the first end surface; and
   at least part of the second cutting edge is more distant outward, in the thickness direction of the cutting insert, than the second seating surface of the second end surface.

* * * * *